Dec. 27, 1932.   N. MILLER   1,891,942
OPTIC PROJECTION
Filed Feb. 13, 1930
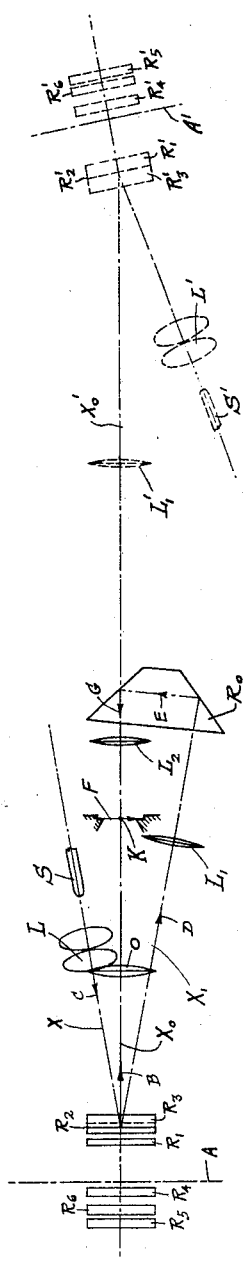
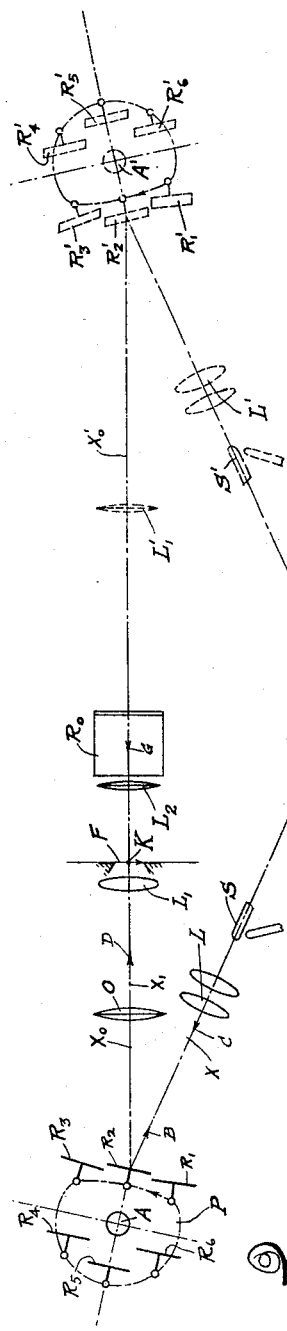
Inventor
Nicholas Miller Patented Dec. 27, 1932                                                        1,891,942

UNITED STATES PATENT OFFICE

NICHOLAS MILLER, OF RIVER FOREST, ILLINOIS

OPTIC PROJECTION

Application filed February 13, 1930. Serial No. 428,125.

This invention is an improvement related to my pending applications Ser. No. 196,252 filed June 3, 1927 and Ser. No. 277,477 filed May 14, 1928. In optic projectors of the above class, the film is continuously moved past an aperture, and the movement of the film pictures is compensated for by movable optic elements disposed between the film aperture and the screen. To conserve the light, and to obtain a uniform illumination of the screen picture, it is necessary to control the light rays which are directed upon the film pictures, and to operate said controlling means in unison with the compensating means.

In the applications above referred to, a series of reflectors revolving about a common axis, and positioned between the objective and the screen, are adapted to compensate for the movement of the film pictures, and another similar reflector system, positioned between light source and the film aperture is adapted to direct the light rays upon the successive film pictures, as they are moved past the aperture.

The mechanical actuations of the compensating reflector system, and of the light controlling reflector system are similar, in that, both series revolve about an axis, and the reflectors have imparted to them an independent rotary or rocking motion, during the time they move through the active zone.

I have made the discovery, that by the suitable choice of the size of reflectors, of the lens system between the reflectors and the aperture, with reference to the size of the light source, the height of the film pictures, in their relation to the focal length of the objective, it is possible to unite the functions of compensation and of light control in the same series of reflectors, and thereby attain considerable structural simplification and compactness.

This result is accomplished, by directing the light from the source upon the compensating reflectors and upon the film pictures, by means of a reflecting prism positioned adjacent to the aperture; the effect of this is substantially equivalent to that produced by the independent light controlling reflector system described in my applications above referred to.

In the accompanying drawing Fig. 1 is a diagrammatic side view of the apparatus. Fig. 2 is a top view of Fig. 1.

In Figures 1 and 2, $R_1$, $R_2$, $R_3$, etc. represent the series of compensating reflectors arranged about an axis A, and the pivots of said reflectors are adapted to travel in a fixed path P. O represents the objective, F the film at the aperture; $R_0$ is a fixed reflector positioned so as to direct the light rays reflected from the compensating reflectors, upon the film pictures at the aperture; $L_1$ and $L_2$ are lenses disposed between the compensating reflectors and the film pictures. S represents the source of light, and L is a condensing lens system for projecting a light field from the source S upon the compensating reflectors.

$X_0$ represents the optic axis of the objective, which intersects the reflector $R_2$ at an angle as shown in Fig. 1; on the top view, Fig. 2, the optic axis of the objective is seen to be in a direction perpendicular to the axis A and the pivots of the compensating reflectors. The axis X of the condenser lens system is below, and to one side of the objective axis $X_0$, and is directed toward the same point on the reflector $R_2$ as the axis $X_0$ so that, a light ray along the condenser lens axis X, in the direction of the arrow C, will be deflected upward and on the other side of the objective axis $X_0$, along the line $X_1$, in the direction of the arrow D. It will be observed in Fig. 1, that the objective axis $X_0$, and the reflected axial ray $X_1$ of the condenser lenses, are on the same level, and therefore, on this view, appear to coincide, but are shown in their true relation in Fig. 2.

A light ray proceeding along $X_1$ is intercepted and reflected by the fixed reflecting prism $R_0$ in the direction of the arrows E and G, upon the center of the film picture aperture at K. From K the ray proceeds to the objective O, and thence to the compensating reflector $R_2$ to be finally reflected in the direction of the arrow B toward the center of the screen. The ray directed from the compensating reflector $R_2$ to the screen, is in a vertical plane with the objective axis $X_0$, directed downward, and in Fig. 1 it appears to coincide with the projection of the condenser axis X. What has been described is the path of an axial ray proceeding from the source to its destination on the screen.

In optic projectors of this type (as explained in my pending applications) it is essential, for the conservation of light and for the attainment of a uniform illumination of the screen picture, that the successive film pictures be continuously and uniformly illuminated, and that picture rays of adjacent film pictures be maintained separated; that is, that all the picture rays belonging to a film picture, or to parts of adjacent pictures (at the aperture), be directed only to corresponding compensating reflectors.

These conditions may very satisfactorily be fulfilled, by projecting the images of a series of reflectors, substantially in superposition upon the film pictures, in such a way, that the images of the parallel edges of the reflectors shall always fall upon the top and bottom edges of the film pictures. Simultaneously an image or images of the source are directed substantially upon the corresponding reflectors.

In the present invention the compensating reflectors are adapted to perform this light controlling function, besides the other and succeeding function of compensation, that is, rendering the continuously moving film picture image to appear stationary on the screen. Thus, as the light field from the source and the condensing system L illuminates the compensating reflectors, an image of said reflectors is projected by the lenses $L_1$ and $L_2$, in the manner above described, upon the film pictures at the aperture. The image of the source is simultaneously projected, by these same lenses, through the objective, to corresponding compensating reflectors.

It is to be observed, that the proper positioning of the source images upon the compensating reflectors depends upon the movement of these same reflectors about their pivots, so that, to obtain proper functioning, the compensating movement of the reflectors must coincide, with that, required for properly positioning the image source upon the same reflectors. This I have found to be readily attainable, by the proper choice of the lens system $L_1$ and $L_2$, with reference to the size of the compensating reflectors, of the size of the source, of the height of the film pictures, in their relation to the focal length of the objective.

These optic elements, from which the reflecting prism $R_0$ receives illumination, produce the same effects, as if these elements were positioned, where their virtual images appear to be formed by the reflector prism $R_0$, and for purposes of analysis, it is advantageous to consider these virtual images in combination, as composing the optic system. Thus $L_1'$, represents the virtual image of the lens $L_1$; $R_1'$, $R_2'$, $R_3'$ etc. represent the virtual images of the reflector system $R_1$, $R_2$, $R_3$ etc. and $L'$ and $S'$ represent the virtual images of the condensing lenses L and of the source S.

What I claim is:

1. In an optic projector, a series of compensating reflectors adapted to compensate for the movement of the film pictures; a source of light, and means for directing the light field upon the compensating reflectors; a film picture aperture; a lens system and a relatively fixed reflector, positioned to receive the light field reflected from the compensating reflectors, and to direct said light field upon the film picture aperture; an objective disposed between the aperture and the compensating reflectors, for projecting the picture rays from the aperture, upon the compensating reflectors.

2. In an optic projector, a series of compensating reflectors adapted to compensate for the movement of the film pictures; a source of light, and means for directing the light field upon the compensating reflectors; a film picture aperture; a lens system for receiving the light rays from the compensating reflectors and adapted to form real images of said reflectors, the height of said images being substantially equal to the height of the film pictures; a relatively fixed reflector positioned to reflect the images of the compensating reflectors substantially in superposition upon the film pictures in the aperture, and an objective adapted to receive the picture rays from the aperture and to direct them to the compensating reflectors.

3. In an optic projector, a series of compensating reflectors adapted to compensate for the movement of the film pictures; a source of light, and means for directing the light field upon the compensating reflectors; a lens system adapted to form real images of the source, and a relatively fixed reflector, positioned to direct said light field upon the film pictures in the aperture; an objective disposed between the aperture and the compensating reflectors, for receiving the rays from the aperture and for projecting the real images of the source, substantially upon corresponding compensating reflectors.

4. In an optic projector, a series of compensating reflectors adapted to compensate for the movement of the film pictures; a source of light, and means for directing the light rays upon the compensating reflectors; a film picture aperture; a lens system positioned in the light field reflected from the compensating reflectors, and forming real images of the compensating reflectors and of the light source; a relatively fixed reflector positioned to direct said real images of the compensating reflectors substantially in superposition upon the film pictures in the aperture, and an objective disposed between the aperture and the compensating reflectors, for receiving the picture rays from the aperture, and projecting said images of the source substantially upon the compensating reflectors.

NICHOLAS MILLER.